United States Patent [19]

Carlson

[11] 4,112,249
[45] Sep. 5, 1978

[54] BUS TRAY ELECTRICAL DISTRIBUTION SYSTEM

[76] Inventor: Elmer T. Carlson, Sandpiper Bay Marina, Port St. Lucie, Fla. 33452

[21] Appl. No.: 755,446

[22] Filed: Dec. 29, 1976

Related U.S. Application Data

[63] Continuation-in-part of Ser. No. 554,684, Mar. 3, 1975, Pat. No. 4,008,365.

[51] Int. Cl.² ............................................... H02G 5/06
[52] U.S. Cl. .................................. 174/68 B; 174/88 B
[58] Field of Search .................. 174/16 B, 68 B, 70 B, 174/71 B, 72 B, 88 B, 88 S, 99 B; 307/147; 339/22 B; 361/355, 361, 378

[56] References Cited

U.S. PATENT DOCUMENTS

| | | | |
|---|---|---|---|
| 2,372,267 | 3/1945 | Frank et al. | 174/99 B |
| 2,955,147 | 10/1960 | Carlson | 174/88 B X |
| 3,095,469 | 6/1963 | Cataldo | 174/88 B |
| 3,504,100 | 3/1970 | Yatabe et al. | 174/88 B |
| 3,644,663 | 2/1972 | Carlson | 174/68 B X |
| 3,803,343 | 4/1974 | Carlson | 174/68 B X |

*Primary Examiner*—Laramie E. Askin
*Attorney, Agent, or Firm*—Eugene Chovanes; Edward Lovett Jackson

[57] ABSTRACT

The invention relates to single, paired opposite phased and multiple stacked insulated flexible or rigid bus bar electrical conductors of copper or aluminum assembled side by side (optionally in a factory or at installation site) as high current density circuits into open trays of substantial length and covers to totally enclose a heat transfer tray co-extensive with the tray and having clamps extending across the tray to secure the cover to the tray and urging the cover upon conductors or conductor joints in the tray by tightening single bolts per clamp. The system includes also making operable end-to-end overlap compression circuit joints of bus bar conductors simultaneously with one or more single bolt clamps for each single, paired phase and multiple stack, electrically insulated apart and supported within the metal tray. Employment of the single, paired phase and stacked circuit configurations of bus bars and joints for use in the many embodiments of use, application and installation is made in bus tray circuit components such as elbows, branch tap boxes and terminations. Another embodiment consists of insulated bus bar conductors assembled as paired phase circuits into bus tray having one conductor of each paired phase bared, folded and extended into protected access at spaced intervals for engagement of plug-in and bolted branch circuit loads.

12 Claims, 24 Drawing Figures

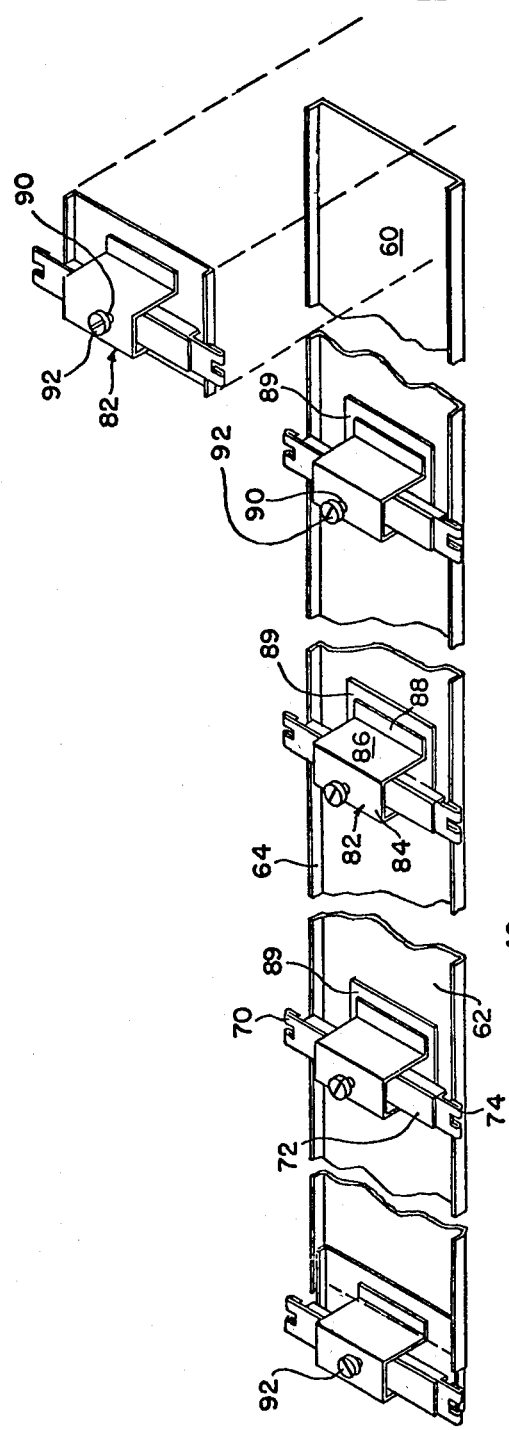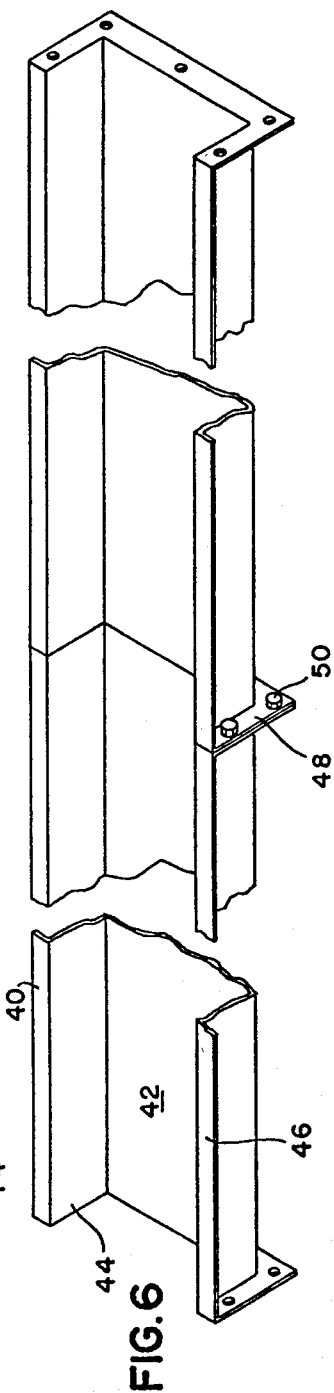

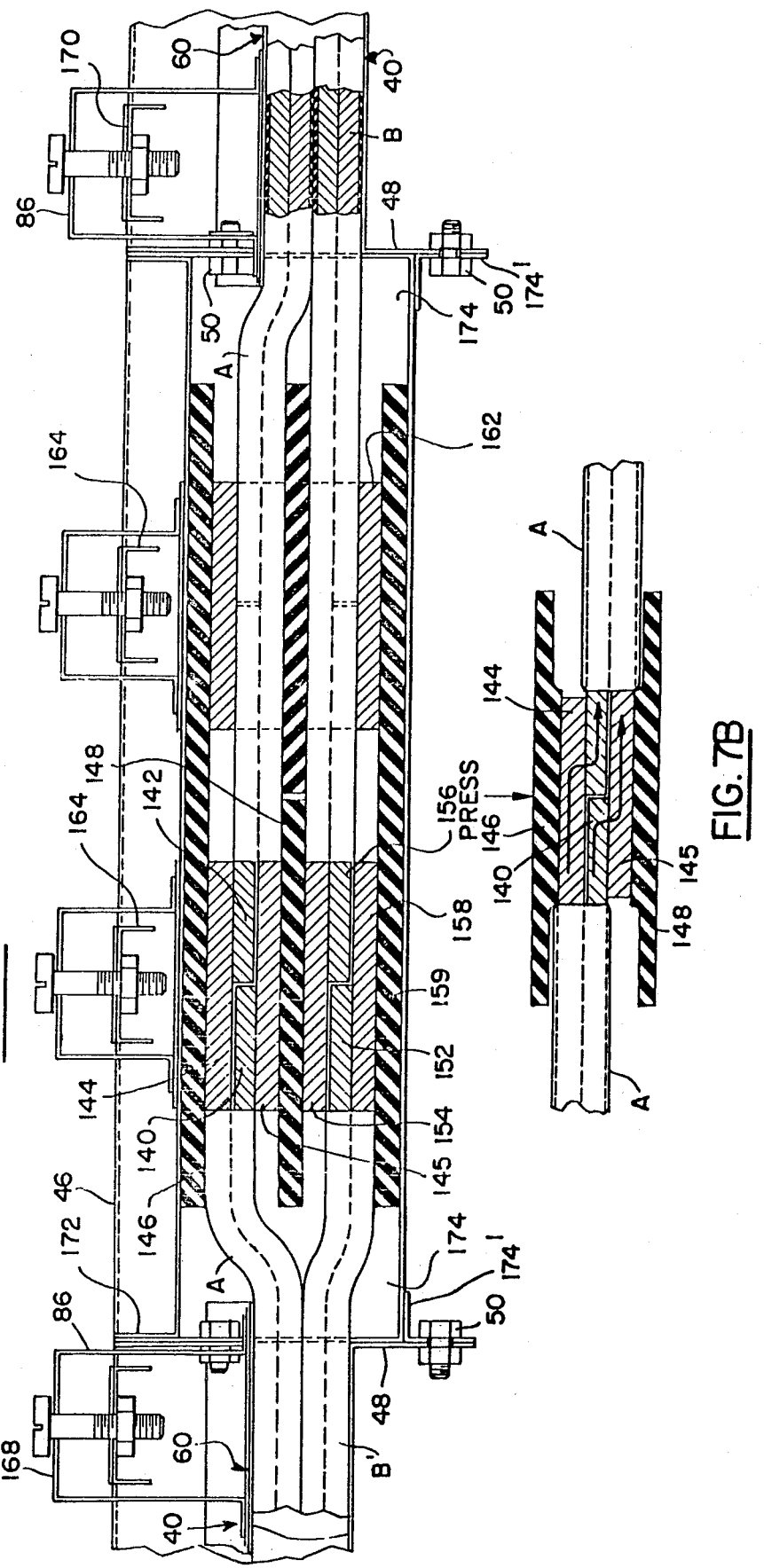

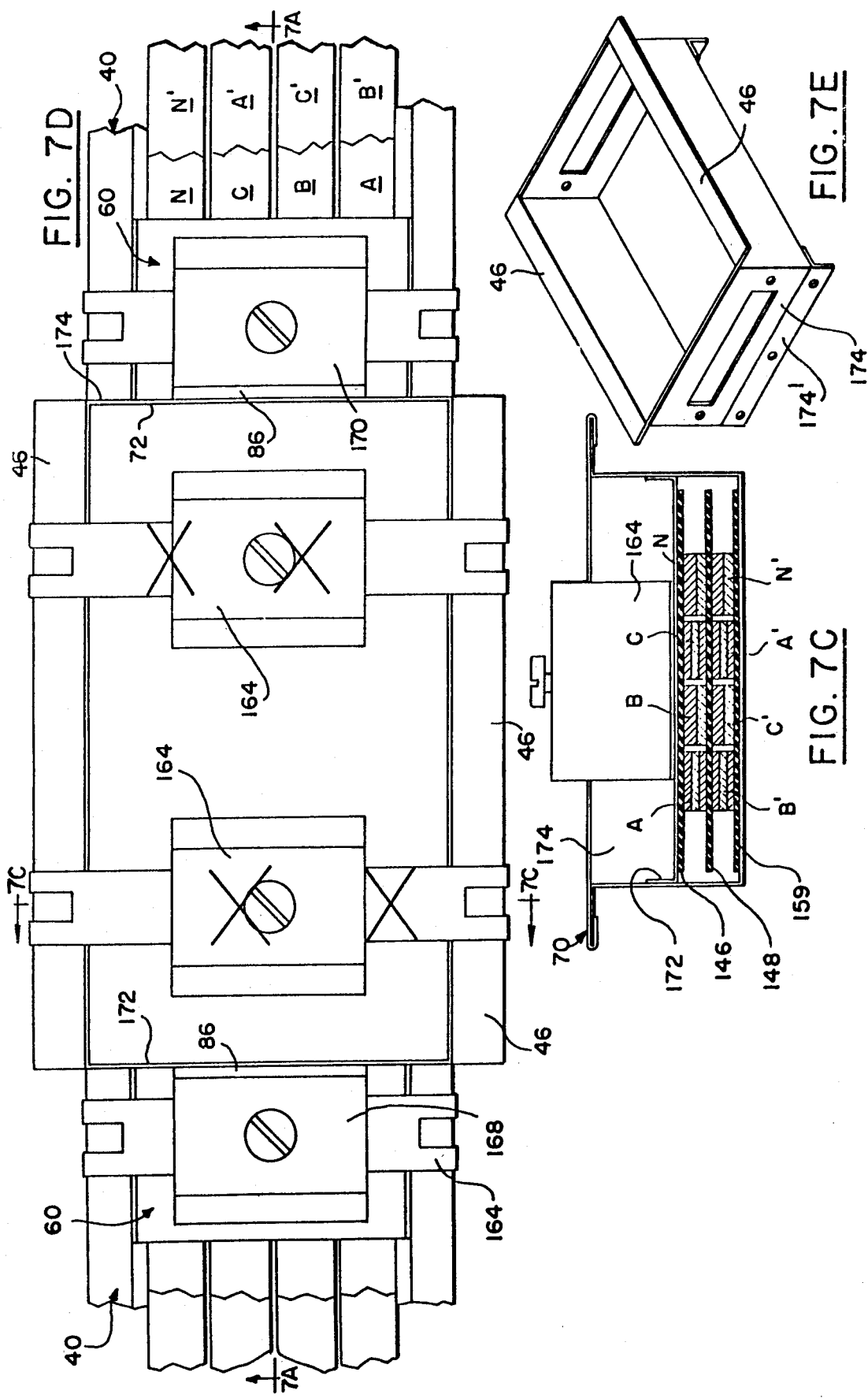

BUS TRAY ELECTRICAL DISTRIBUTION SYSTEM

DISCLOSURE OF INVENTION

This application is a continuation-in-part of my U.S. patent application Ser. No. 554,684, filed Mar. 3, 1975, now U.S. Pat. No. 4,008,365, for Bus Tray Electrical Distribution System, which is hereby incorporated by reference herein, and the benefit of whose filing data under 35 USC 120 is hereby claimed.

In my U.S. Pat. No. 3,504,097 I describe how both round and flat shaped insulated conductors will carry more current in an electrical circuit by assembly within a metal tray in a manner to effect rapid heat transfer of line losses to surrounding air. I have learned by tests that a higher rate of heat transfer is obtained in my bus tray design by solid rectangular bus bars than round stranded concentric lay wires. I further learned assembled conductor ampacity could be significantly increased by placing flat conductors and circuit joints of an A.C. circuit in intimate and opposite phase relationship to each other and to the tray enclosure. This selection of two bi-laminated bus bars per phase increases the conductor heat transfer contact area, reduces the heat gradient distance and lowers heat losses due to line reactance and joint resistance. Due to lower circuit reactance of the paired phase bus bars, voltage drop is reduced to a minimum. The division of high fault currents in paired phase circuit reduces mechanical stresses and improves system reliability.

Neutral conductors of three-phase, four-wire circuits divided into three bus bars may be sandwiched between the opposite and paired phases and maintain balanced voltage of the circuit line to neutral without transpositions as is required in ordinary busways.

My invention is a total electrical distribution system which provides improved and lower cost power feeder transmission functions achieved by an assembly of components of my bus tray system. Busway system feeder products for electrical distribution systems ordinarily consist exclusively of factory assemblies of bus bar circuits into straight section lengths and fittings for field joining together into runs. Bus tray may be optionally delivered to a point of installation factory assembled with conductors (such as busway) or may consist of an open tray and fittings field joined into a run, into which flexible or rigid bus bars of continuous or partial circuit length are laid in place to be enclosed and bolt-compressed by covers having attached clamps of special design. Further the bus tray installation may consist of runs having portions with conductors optionally factory and field assembled.

In a run bus tray fittings are provided to terminate the circuit, make turns, join conductors and attach branch circuits. Bus tray installation planning allows circuits of none or relatively few joints between run terminals. Bus bar conductors are solid or laminations of solid ductile copper and aluminum insulated as single or plurality of conductors per phase. A common denominator width may be selected for bus bars and the thickness and number of metal laminations varied to obtain desired assembled circuit ampacities. The bus tray cover clamp adjusts to provide compression to varying thickness bus bars, and varying number of stacked bus bars of a circuit, thereby making it possible to interchangeably field assemble copper or aluminum circuits in a wide range of ampacities in a single size tray. Representative range of bus tray circuit ampacities in a single tray would be 400-600-800 and 1200. It should be noted these ampacities are for bus tray circuit assemblies as marked on the tray and do not apply to unassembled bus bar conductors. Since bus tray circuits of equal ampacity and length have matched impedance, parallel circuits may be connected as runs to obtain increased ampacities such as 1600-2400-3600 and 4800.

The efficient compact bus bar circuit allows the selection of a bus tray of small dimension and light weight to take less building space and allow easy installation. The cover clamp performs simultaneously functions of attaching the cover to the tray and moving the cover into compression of enclosed bus bars and bus bar joints by the simple tightening of one bolt.

In buildings vertically assembled bus bars are clamped within the bus tray run and are inherently provided with required circuit weight support.

The cover clamp design lowers the manufacturing cost of bus tray and reduces field assembly time as compared with the numerous cover assembly nuts and bolts that were employed in the cable bus of my U.S. Pat. No. 3,803,343. The ease of installing and removing the bus tray covers allows for flexibility and low cost interchange of a wide range of conductor ampacities in existing bus tray installations to meet increased power needs without disturbing the run tray installation.

Unique to a bus tray run is the clamp provision to join simultaneously all totally enclosed circuit bus bar conductors within a tray or fitting. My invention includes such a fitting to effectively maintain heat transfer from the joint assembly, safe insulation, substantial mechanical support of terminals and easy access of joining and enclosing the bus bars employing one or more single bolt clamps for each single, paired phase or stacked three phase multiple grouping of circuit conductors which could also include a neutral between paired phases.

Bus tray runs in some applications are tapped with circuits to branch loads and I provide a suitable bus bar connector for assembly into a bus tray having an attached enclosure to contain bare conductor protrusions suitably spaced and insulator supported for attachment of branch circuit conductor and protective devices by bolt or "clip-on" fastening.

This bus tray invention relates to an electrical distribution system comprising physical and electrical matching components consisting of a covered tray, flexible single, paired phase and three-phase stacked circuits of bus bar conductors, bus bar joints, and various circuit fittings for job site assembly in buildings (interchangeably) as high ampacity feeders in radial or tree layout that perform in compliance with pre-tested circuit ampacities as marked on the run tray components.

A basic purpose is to make open elongated trays for job site lay-in of extended electrical conductors to be totally enclosed and compressed by secured covers retained by single bolt clamps to the tray, in a manner to allow rapid installation, removal or replacement of conductors.

In a connector box to join one section to another, or in trays of a run, advantage is taken to balance system voltage drop and at the same time join the cables under pressure.

A further purpose is to employ ductile aluminum and copper insulated conductors of one or laminations of bus bars of equal interchangeable size and cross sections for assembly as circuit conductors relatively thin in relation to width to achieve edgewise bending flexibility required for continuous length production and reeling.

A further purpose is to adhere the wide surface of single bus bars per phase circuit conductors and two bus bars insulated conductors of equal cross section into opposite paired phase legs of multiphase alternating current circuits interchangeable in the same size tray.

A further purpose is to gain increased area of heat transfer contact of one or two stacked thin bus bars per circuit phase and to assure a short distance heat transfer gradient.

A further purpose is to reduce heat of line losses by lowering circuit impedence by close spacing of opposite phase bus bars and dividing phase conductors.

A further purpose is to reduce short circuit mechanical stresses by a division of line current.

A further purpose is to provide dimensional interchangeability of single phase, three-phase and three-phase four-wire solid neutral circuits of single, paired phase and stacked bus bar to total varying thicknesses of equal width in a single bus tray.

A further purpose is to save material cost and installation time.

A further purpose is to minimize tray size to minimize use of building space.

Another purpose is to reduce the weight of aluminum, copper and steel required for electrical distribution by reducing line reactance and efficient heat transfer from the tray to the surrounding air.

Another purpose is to eliminate or minimize the number of conductor joints in a feeder circuit.

A further purpose is to provide in runs a total metal enclosure of low resistance overlap joints of paired and stacked bus bar circuit conductors which are electrically insulated apart, rigidly supported and compressed between insulation panels by covers with one or more single bolt clamps.

A further purpose is to provide a minimum variety of tray dimensions and bus bar conductors that can be interchangeably used to assemble a wide range of feeder circuit ampacities in radial or tree system arrangements.

A further purpose is to employ a single bolt clamped overlap joint for the electrical connection of all functional fittings into the bus tray system.

A further purpose is to provide a tray having spaced openings, each enclosed with a box, with provisions to extend branch circuits by direct attachment of conduit and wire or disconnect protective devices having "plug-in" or lug tap provisions.

A further purpose is to provide a single or paired phase bus bar conductor having folded bared conductor protrusions spaced in a circuit in staggered relationship to coincide with insulated openings of the tray and box enclosure in suitable length to permit bolt-on or plug-in engagement for a branch circuit extension.

In the drawings I insert an exemplified showing of the invention.

FIG. 5 is a fragmentary perspective of the cover and clamps.

FIG. 6 is a fragmentary perspective of the bus tray.

FIG. 7A is a fragmentary section of a circuit bus bar joint employing cover clamps with the section taken on the line 7A—7A of FIG. 7D.

FIG. 7B is a detail of FIG. 7A to show a sandwich bus bar joint.

FIG. 7C is a section at the line 7C—7C of FIG. 7D.

FIG. 7D is a plan view of the joint as set out in FIGS. 7A to 7C.

FIG. 7E is a perspective of the joint box.

FIG. 14 illustrates the potential economy of aluminum conductors as high capacity feeders at a low voltage such as 600 volt electrical distribution systems in industrial and commercial buildings having totally enclosed ampacities according to the "Cablebus" article 365 of The National Electrical Code and Table 365-19, 85° C. temperature rating which is part of that article.

Curve A shows current density of single 250, 500 and 750 MCM insulated aluminum conductors of the bus tray consisting of assemblies of aluminum strips. Each strip equals 250,000 circular mills. The respective ampacities according to The National Electrical Code Table 310-19 are 330, 515 and 670 as three-phase circuit assemblies of totally enclosed bus trays.

Curve B shows the current density of conductors described above as paired opposite phase, three-phase circuit assemblies of 500, 1000 and 1,500 MCM having ampacities 660, 1030 and 1340 respectively in a single tray. Higher ampacity circuits consist of parallelling matched impedance circuits, for example of 2060, 2680 and 4020 as plotted.

Curve C shows current density of feeder bus tray of heat transfer design having a compressed stack of insulated bus bars and ampacities rated as 85° C. temperature rating.

Curve D shows current density of plugin busway having air space stack of insulated bus bars and ampacity rated 85° C. temperature.

Curve E shows current density of aluminum conductors in conduit and enclosed raceways according to National Electrical Code Table 310-18.

Figure 4:
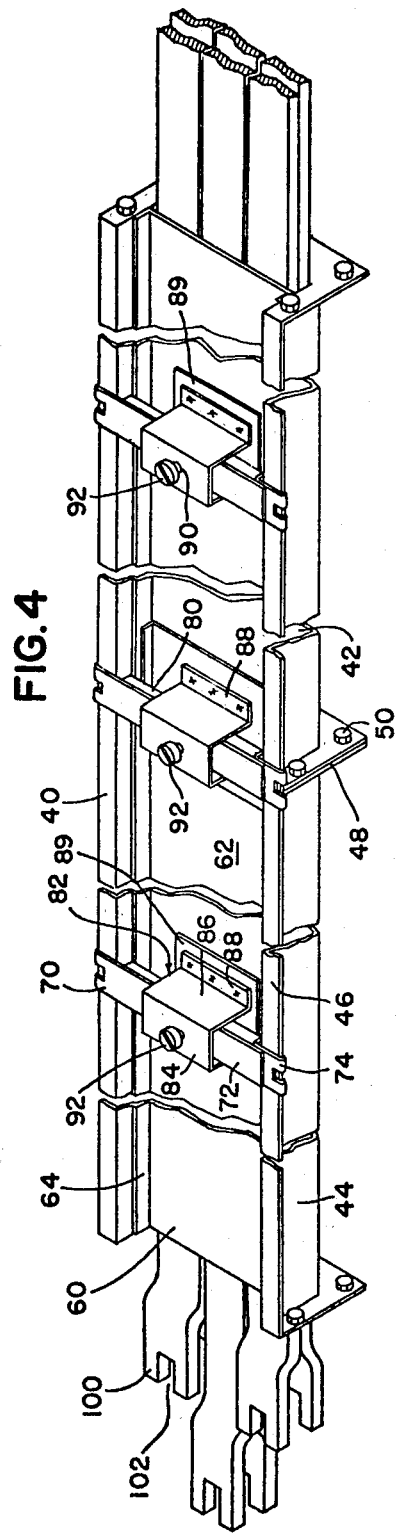
FIG. 4 is a fragmentary perspective of the bus tray with a phase arrangement of a three-phase bus bar circuit.
Figure 15:
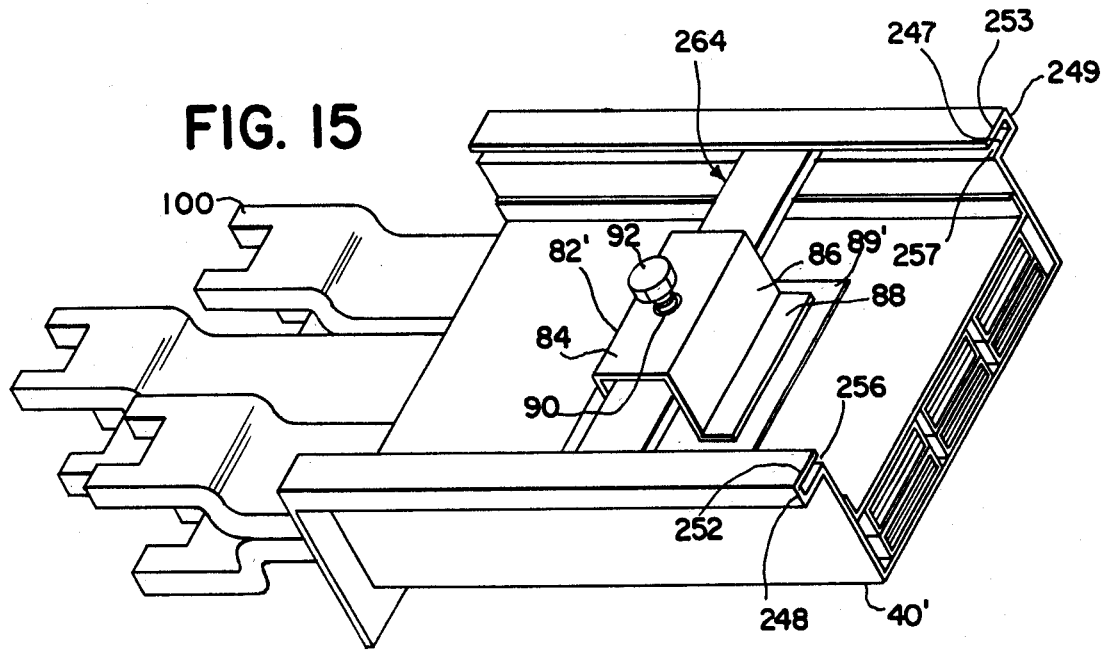

FIG. 15 is a perspective view of the bus conduit setup of my invention corresponding to the lefthand portion of FIG. 4, but of a preferred different embodiment.

Figure 16:
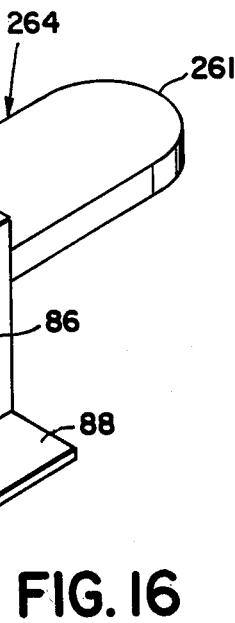

FIG. 16 is an enlarged perspective view of a portion of the setup shown in FIG. 15.

Figure 1:
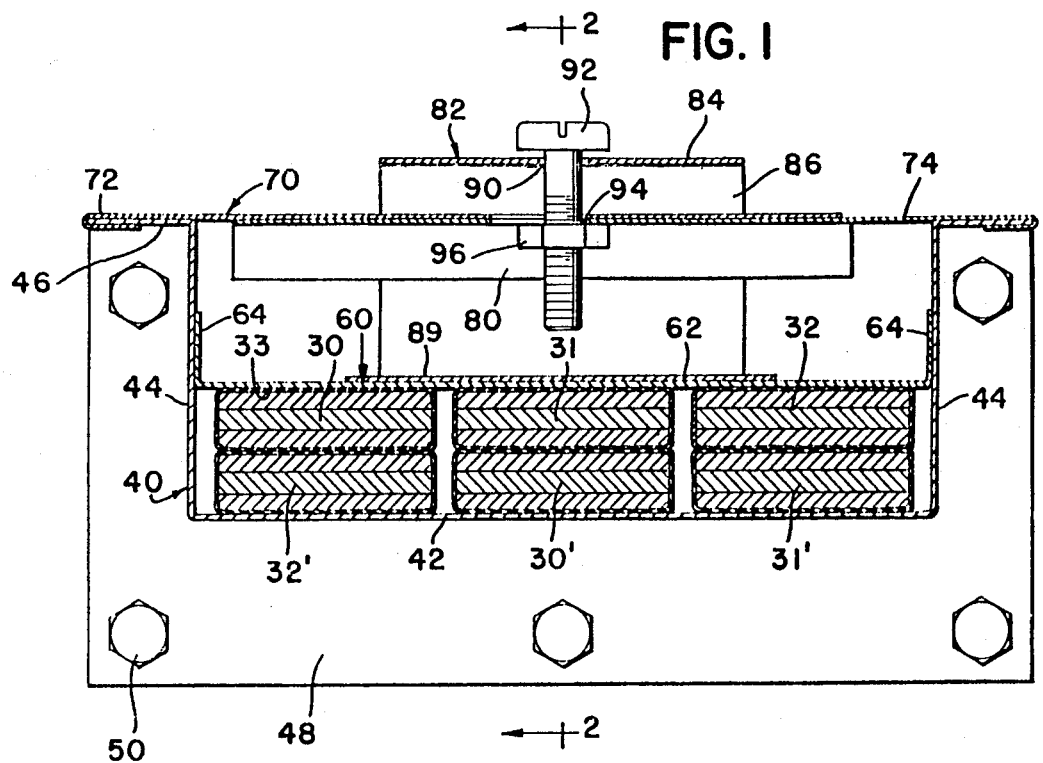
FIG. 1 is a cross section through the tray assembly.
Figure 2:
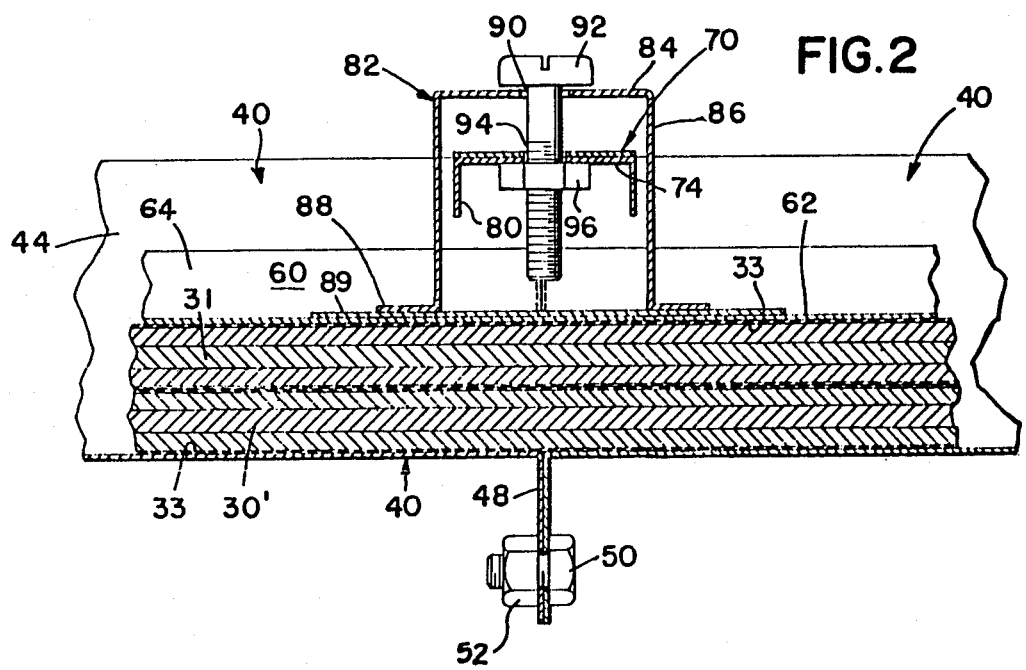
FIG. 2 is a longitudinal section of the tray assembly.
Figure 1A:
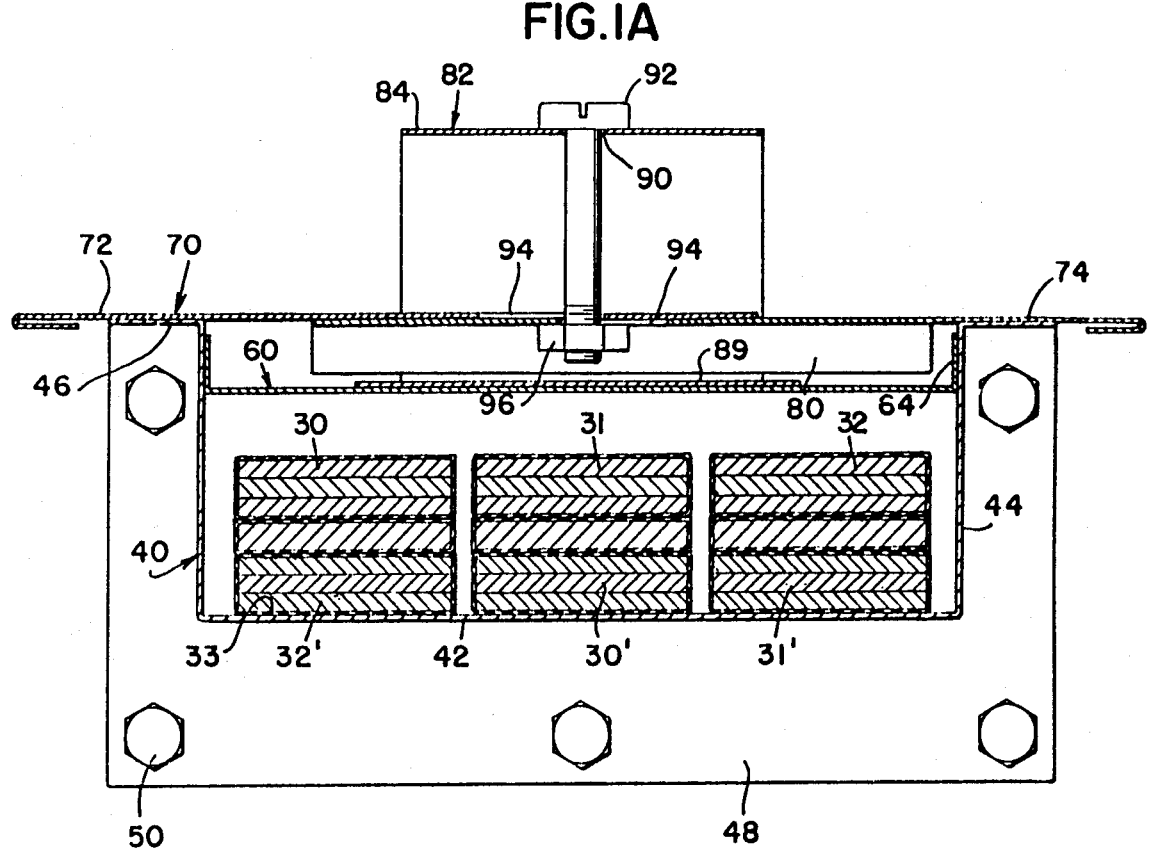
FIG. 1A is a cross section of the tray assembly with the clamp open ready for attachment.
Figure 1B:
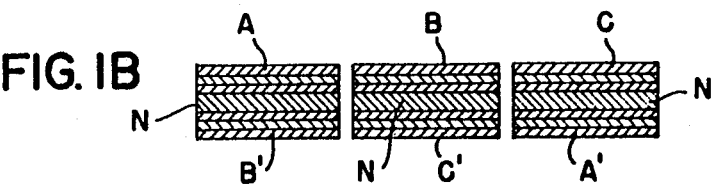
FIG. 1B is a cross section of a paired opposite phase circuit with neutral following FIG. 1A.
Figure 17:
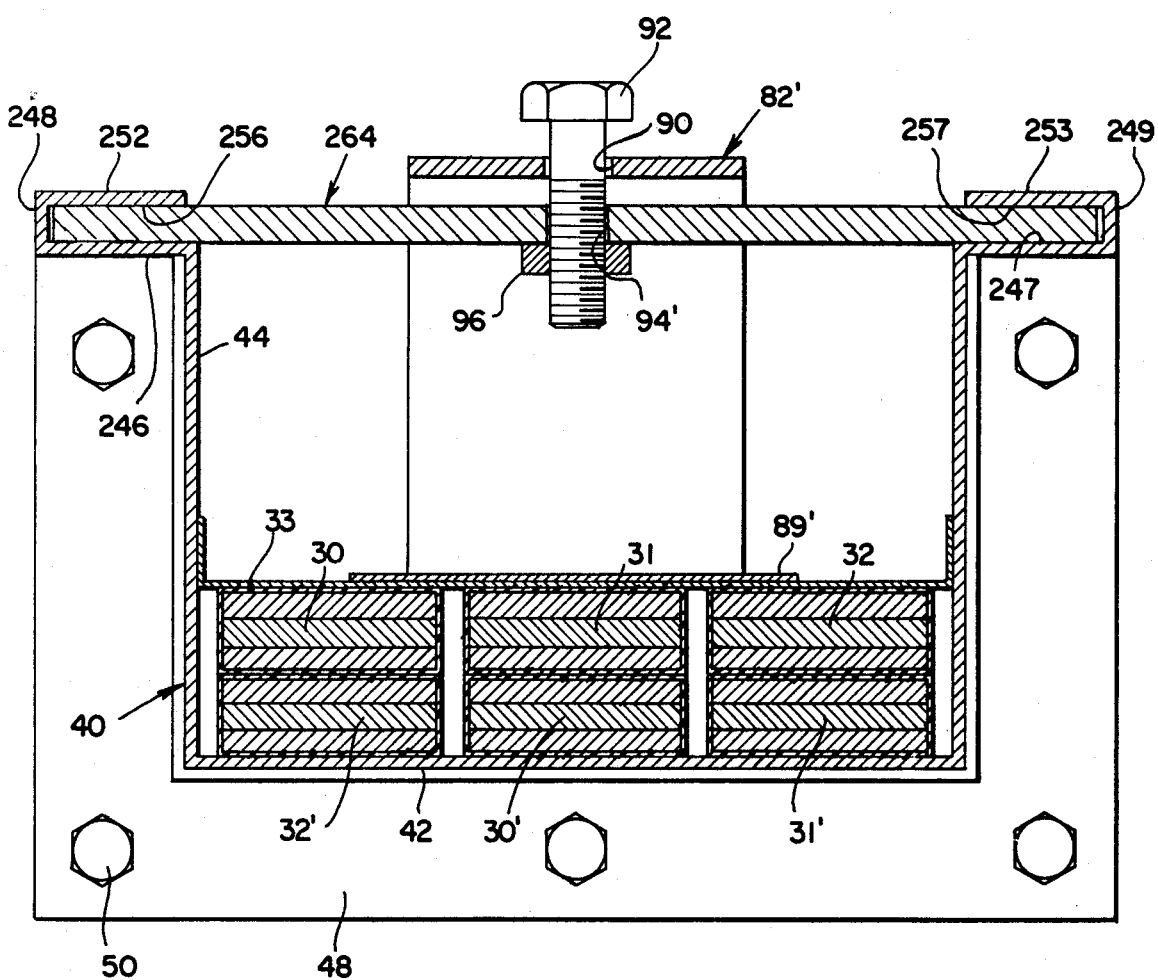

FIG. 17 is a cross-sectional view corresponding to FIG. 1, but of the embodiment shown in FIGS. 15 and 16.

Insulated copper conductors, in assemblies of equal size are interchangeable in trays and fittings with aluminum conductors.

Table I shows the data curves A and B and also like data of equal cross section copper conductors.

TABLE I

Figure 14:
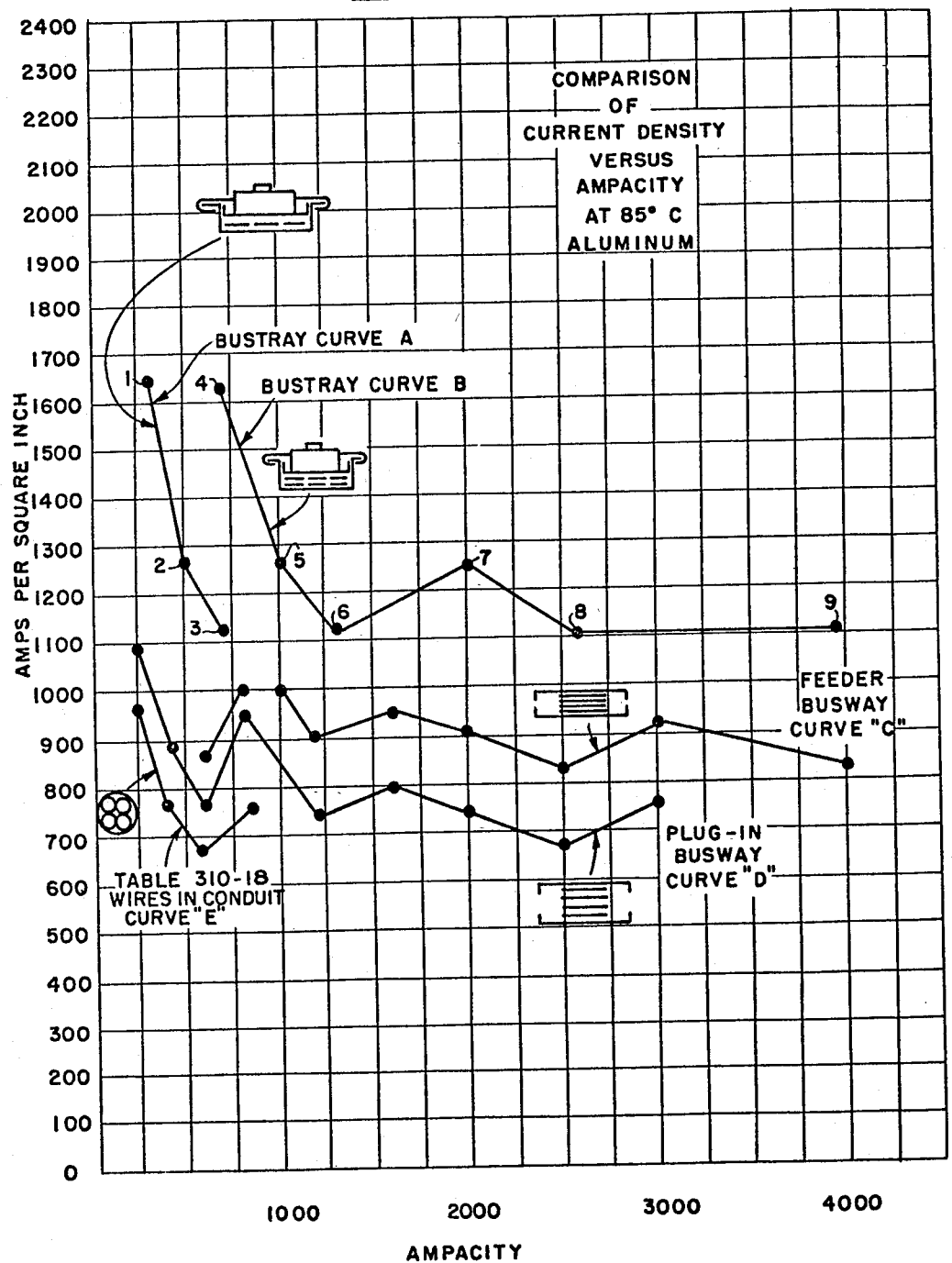
FIG. 14 is a series of curves comparing current densities of Bus Tray Cablebus, Busways and Wires in Conduit at various ampacities according to provisions of The National Electrical Code (1975 Edition).

| Fig. 14 No. | Table 310–19 MCM | 85° C. AMP. | No. Cond. per phase | Circ't. MCM. | Circ't. AMP. | Sq.in. per circ't phase | Amps per sq.in. |
|---|---|---|---|---|---|---|---|
| ALUMINUM | | | | | | | |
| 1 | 250 | 330 | 1 | 250 | 330 | .2 | 1650 |
| 2 | 500 | 515 | 1 | 500 | 515 | .4 | 1288 |
| 3 | 750 | 670 | 1 | 750 | 670 | .6 | 1117 |
| 4 | 250 | 330 | 2 | 500 | 660 | .4 | 1650 |
| 5 | 500 | 515 | 2 | 1000 | 1030 | .8 | 1288 |
| 6 | 750 | 670 | 2 | 1500 | 1340 | 1.2 | 1117 |
| 7 | 500 | 515 | 4 | 2000 | 2060 | 1.6 | 1288 |
| 8 | 750 | 670 | 4 | 3000 | 2680 | 2.4 | 1117 |
| 9 | 750 | 670 | 6 | 4000 | 4020 | 3.6 | 1117 |
| 310-17 | | | COPPER | | | | |
| 1 | 250 | 425 | 1 | 250 | 425 | .2 | 2125 |
| 2 | 500 | 660 | 1 | 500 | 660 | .4 | 1650 |
| 3 | 750 | 845 | 1 | 750 | 845 | .6 | 1408 |
| 4 | 250 | 425 | 2 | 500 | 850 | .4 | 2125 |
| 5 | 500 | 660 | 2 | 1000 | 1320 | .3 | 1650 |
| 6 | 750 | 845 | 2 | 1500 | 1690 | 1.2 | 1408 |
| 7 | 500 | 660 | 4 | 2000 | 2640 | 1.6 | 1650 |
| 8 | 750 | 845 | 4 | 3000 | 3480 | 2.4 | 1408 |
| 9 | 750 | 845 | 6 | 4000 | 5070 | 3.6 | 1408 |

Thus for a three-phase system the thin bus bars are 30, 31 and 32 and 30', 31' and 32'. The bus bars are covered by insulation 33.

The bus bars are laid in a tray 40 side by side, the tray 40 consisting of a straight portion preferably horizontal 42, two preferably vertical portions 44, two straight portions 46, preferably horizontal.

The trays are joined at each end by flanges 48 connected together by plate retained bolts 50 having nuts 52.

The trays are covered by a cover 60 which has a preferably horizontal portion 62 and two preferably vertical portions 64 so that the cover is a U or channel.

The tray has across it at various intervals clamps 70 consisting of a stationary clamp portion 74 and a movable clamp portion 72.

The stationary clamp has a stiffener channel 80 beneath it although this may be made from one side of the clamp. Each clamp is straddled by a horseshoe member 82 having a base of the U 84, arms of the U 86 and projecting ends 88 which are held to the cover as by spot welding or optionally welding to a separate plate 89.

The base of the U at the center has an opening 90 receiving a bolt 92, and the clamp has a corresponding opening 94 for the bolt which corresponds in position with a captive nut 96 held to the bottom of the stiffener member. Thus the bolt passes through the U and into the captive nut and brings pressure against the cover to tighten the cover on the insulation and the bus bars.

At the ends of the trays, overlapping the joint, I place a separate clamp having plate 89 with an inverted U channel to provide extra strength in the bus tray flanges. At and co-incident with the tray flanges at the end of the cover, where it is connected to another cover, the pressure plate 89 assembles so as to close the joint opening.

Figure 7:
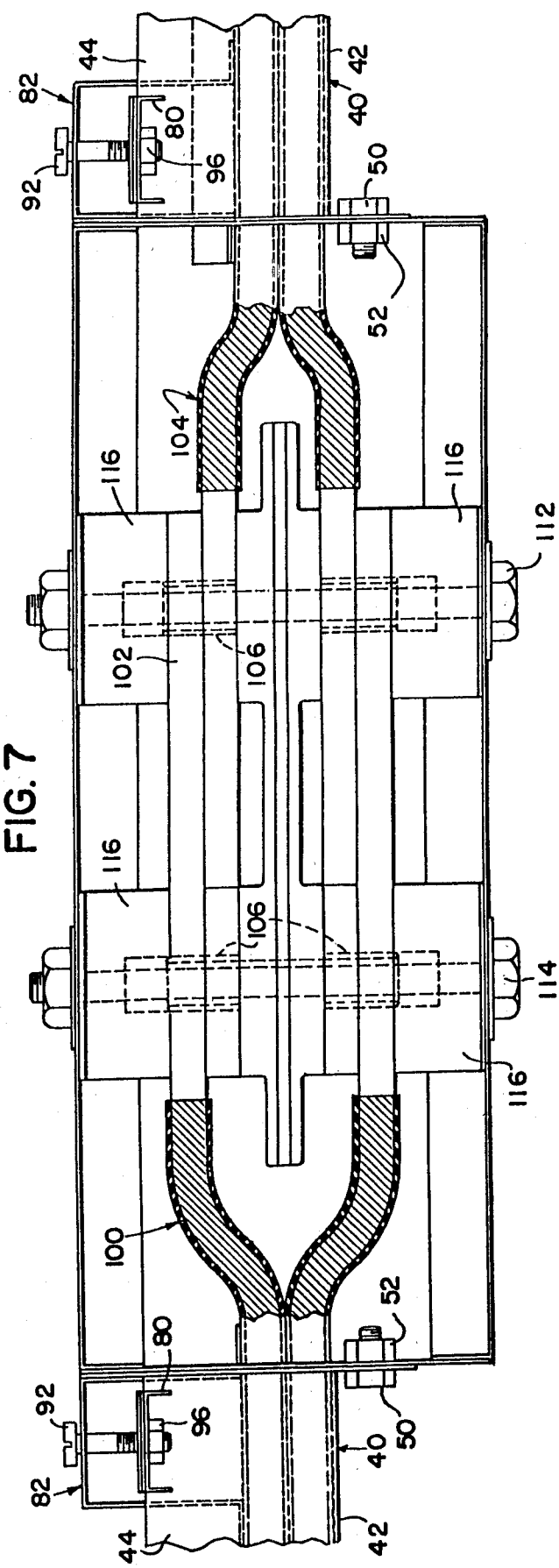
FIG. 7 is a fragmentary section of a circuit phase bolted bus bar joint made in a separate box assembled in a run.

In a tray run, circuits may be joined within boxes wherein the bus bars at the ends 100 and 104 have slots 102 and are capable of receiving mating bus bar slots as shown in FIG. 7. The mated bus bars engage insulation 106 at the inside. It will be understood that the bus bar ends are slotted so that they are capable of mating as shown in FIG. 7. The bus bar ends of circuits as shown in FIGS. 8, 9, 10 and 11 are alternately staggered as illustrated by protruding member 110. The joint has bolts 112 and 114 holding it together, and the bolts are covered by insulation 116 and pass through all of the mated bus bar ends.

Although single bolt clamps per phase of FIG. 7 with bolts may be used, I prefer the designs of FIG. 7A in which there is a sandwich of conductor strips to assure low joint resistance by producing large contact area. Another advantage of the sandwich joint forms of conductors is that the total joint height is reduced to minimize the range cover clamp bolts assembly operation.

FIGS. 7A to 7E is a preferred form of joining three-phase or three-phase four-wire circuits consisting of single, multiple and paired opposite phase bus bar conductors in a metal box assembled between trays in a run.

FIG. 7B is a detailed showing of the current flow through a single conductor joint that sandwiches one short segment of each joining two segment conductors between extended segments in order to reduce the total joint thickness yet retain a large area for contact purposes.

In FIG. 7A phases C and A' are directly behind this joint in plan view.

In FIG. 7C conductors A and B' may be the same or opposite phase.

The joints in the detail of FIG. 7B are shown as to location by the cross marks on FIG. 7D. The two middle clamps in FIG. 7D compress the cover and so compress the joint. The two clamps at the left and right in FIG. 7D compress the tray cover and cables and close the openings in the box end.

In FIG. 7E the ends with the openings have provision to bolt the tray flange.

Entering circuits are illustrated as paired opposite phases held by trays 40 with covers 60 and secured to the flanges 174' of box 174 by flanges 48 with bolts 50 and having clamps 168 and 170 to compress the conductors and 86 to close the tray entering openings.

Figure 3:
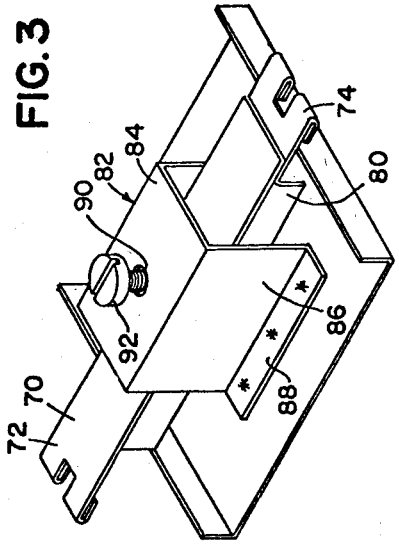
FIG. 3 is a fragmentary sectional perspective of the removable clamp with a compression plate for assembly at joints of sections and fittings of a run.

Joining ends of opposite phased joints are indexed by insulation spacers 159, 148 and 146 into staggered relationship as illustrated in FIGS. 8, 9, 10 and 11 but with slots 102 omitted. All joining strip conductor ends have insulation removed as illustrated in FIG. 7B, and the paired ends terminated in variable length, so that strip end 144 opposes strip end 142, while the joining strip 145 lies against strip 140. Insulation to ground is provided by insulation 146. Phase separation is provided by insulation 148. Likewise in phase B', strip end 154 opposes strip end 156, and strip end 158 lies against strip end 152. Phase B' insulation is provided by insulation 159. Pressure is provided by clamps of FIG. 3 design that engage flanges 46 of the box 174 that bear upon cover 172. Two clamps position laterally on centers of staggered joints 164, one compresses joints of bus bars A–B' and C–A' with the other compressing joints of bus bars B–C' and N–N'.

Figure 11:
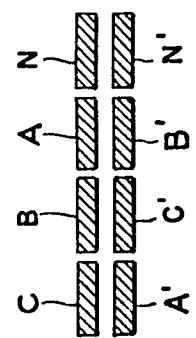
FIG. 11 is an identification of three-phase four-wire bus bar circuit end.
Figure 10:
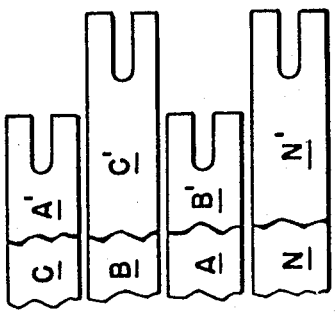
FIG. 10 is an identification plan view of a three-phase four-wire bus bar circuit joining end.
Figure 9:
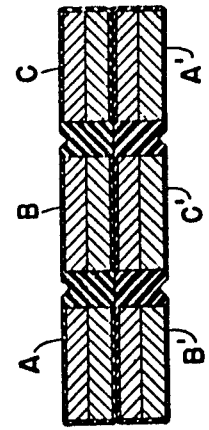
FIG. 9 is an identification section of a three-phase paired-phase bus bar joining end.
Figure 8:
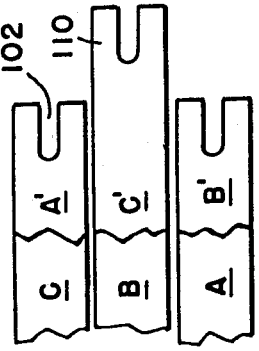
FIG. 8 is an identification plan view of three-phase bus bar joining end.
Figure 12:
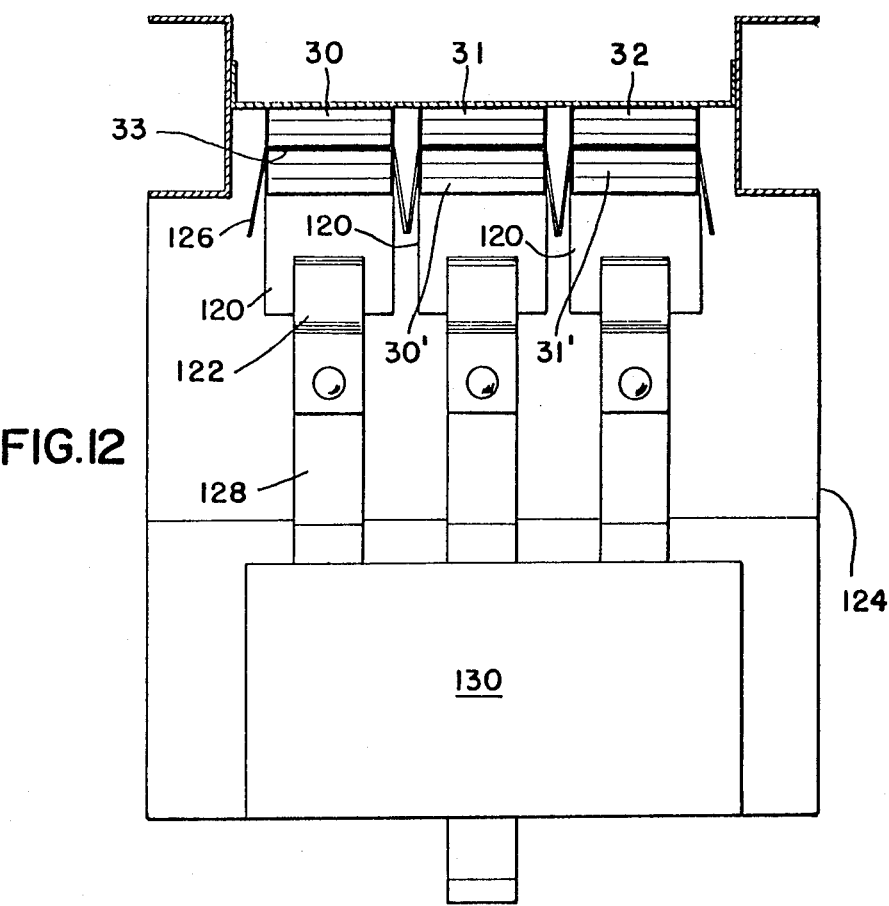
FIG. 12 is a transverse section of the bus bar's protrusion at a branch connection.
Figure 13:
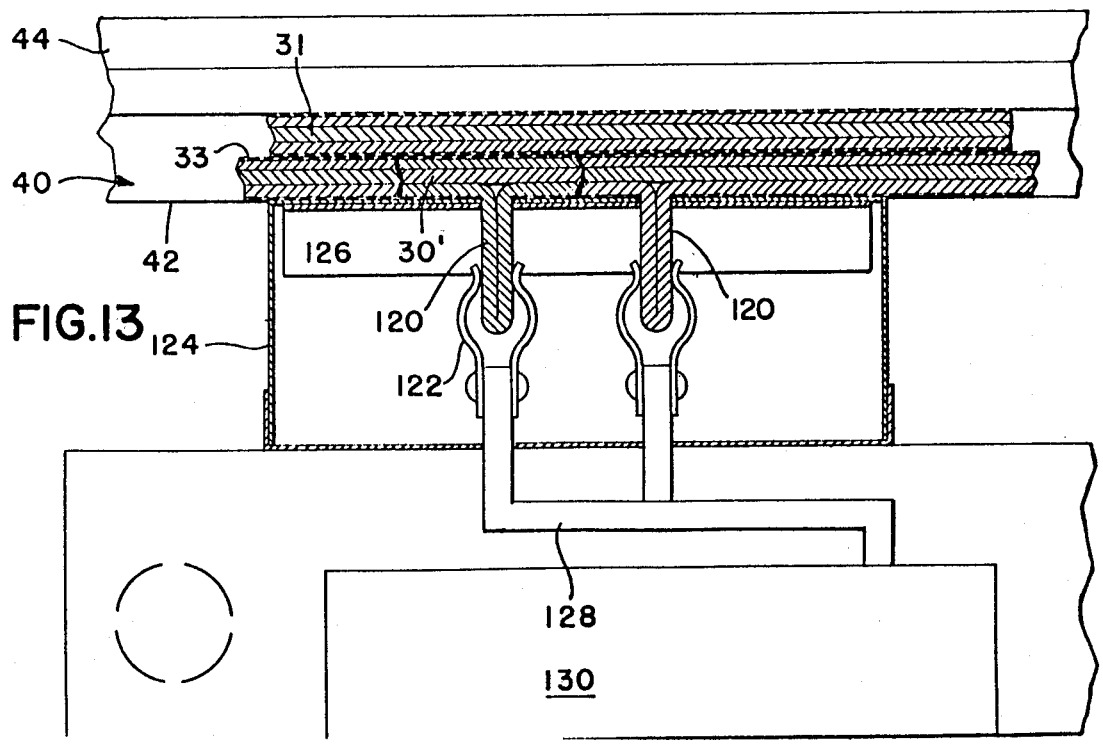
FIG. 13 is a longitudinal section of the branch connection of the bus bar.

The bus tray system circuits include optionally three bus bars connected in tandem as shown in FIGS. 8 and 9 or four bus bars connected in tandem as shown in FIGS. 10 and 11.

FIG. 9 shows a typical cross section of a plurality of conductors as a flat cable encasing the bus bars within one homogeneous insulating jacket. Circuit cables of this design are more economical to produce, field assemble and join. Several multiple conductor cables may be stacked within a single enclosure, with each conductor connected selectively into one or more circuits and benefiting from heat transfer of direct contact with the enclosure. FIG. 9 represents two flat three-conductor cables, each conductor having two strips with these conductors connected by pairs to a three-phase 60-cycle power source in opposite phase relationship, A–B′, B–C′ and C–A′. Obviously, many other conductor arrangements, suitable as high current circuits of various sources and utility of electric power may be made.

At points of branch connection, one or more laminates of bus bars of which a conductor is made folds back as shown at 120 and is at that point deprived of insulation. These lapover points receive connector clamps 122 in a box 124 protected by insulation 126 and connected to leads 128 of the branch circuit. The leads run to a circuit breaker 130.

In the preferred embodiment of FIGS. 15, 16 and 17, tray 40′, which might also be called the conduit or the body of the conduit, is similar to tray 40 in the earlier-mentioned embodiments, except toward its top.

At the top of the upright legs 44 of the U-shaped cross section of the tray, there are outwardly extending flanges 246 and 247, one at the top of one of the upright legs and the other at the top of the other upright leg. When each of the flanges above mentioned reaches its outermost extent, it bends upwardly and back upon itself as shown at 248 and 249 respectively, and terminates in a portion which runs back toward the center of the tray, shown respectively at 252 and 253, there being in each case a space, shown respectively at 256 and 257, between the portion of the flange which is extending outwardly and the portion which is extending back in the opposite direction, which are parallel to each other.

These spaces are in each case of sufficient size to readily accommodate the respective rounded ends 260 and 261 of hold-down member 264 which when in position in the setup extends all the way between a point within space 256 to a point within space 257 and preferably in each case close to the outer ends of those respective spaces. Nut 96 forming part of this hold-down member setup is the same as in the clamp of the form of FIG. 1 and the like and has the same interrelation to the setup as in that, and hole 94′ in hold-down member 264 permits passage of bolt 92, However, the previously-mentioned interrelationship will be understood to be to a single hold-down member 264 rather than two interrelated portions of a clamp assembly such as found in FIG. 1.

FIGS. 15 and 16 show hold-down member 264 in a way to show the width as well as the length, which is preferably of a size to correspond to the width of the two clamp portions in the form of FIG. 1.

Horseshoe member 82′ in this preferred embodiment of FIGS. 15 through 17 is like that in the embodiment of FIGS. 1 and the like, except that horseshoe member 82′ is not spot welded or otherwise welded to the separate plate 89′. If any such welding should be done in the case of this preferred embodiment, it would only be after the conduit with its conductors has been installed, including the putting in place of the hold-down member and horseshoe member.

When the conduit in this preferred form comes to be installed, the tray can be put in place and the conductors in it and the cover on them, and the plate, horseshoe member, bolt, and hold-down member can be brought into position with the hold-down member extending longitudinally, or at least in an oblique position far enough around from the crosswise position to enable it to clear the inner edge of the turned-back part of the flange, and then can be rotated into crosswise position with its ends in spaces 256 and 257 and the bolt then tightened to secure everything in place. More specifically, the tightening bolt will advance the horseshoe member into contact with the cover to apply pressure upon the cover and conductor. The side channels made up of the flange such as 246 and its part turned back at 248 for example to run back at 252 for example, provide back pressure restraint.

This preferred form thus is very simple to install, and at the same time combines the further advantages of having a minimum of overall width dimension, which enables it to fit very well into confined and limited space, and a limited number of separate parts, making for economy of manufacture.

While I prefer to make the conductors rectangular, it will be understood that other shapes may be employed in bus tray.

While I prefer to have the covers of the tray released by the clamps be completely free to provide clear access for conductor assembly, it is readily apparent that advantages of installation may be obtained by supplementing the cover clamps with a hinge to integrate the tray and cover into one unit.

In view of my invention, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A bus bar and conduit setup comprising a U-cross-sectioned channel member having on the upper part of the U at least one pair of members on each side which pairs of members extend inwardly from an outermost point one above the other with a space between them, a set of bus bars within the channel member but insulated therefrom, which bus bars extend longitudinally of the channel member, a cover inside the channel member and above the bus bars and insulated from them, a bridge member having legs extending down to the top of the cover and a bridge portion extending between the legs at a place higher than the cover, the bridge member having an opening for a bolt in it, a hold-down member extending across from within the space between one of the above pairs of members on the channel member to within the space between the other of the above-mentioned pairs of members on the channel member and passing under the bridge portion of the bridge member in between and having interior threads adapted to cooperate with a bolt, and a bolt extending down through the opening in the bridge member at least into the interior thread in the hold-down member and thus adapted to exert pressure on the bridge member and cover from the hold-down member and channel member.

2. A bus bar and conduit setup comprising a channel member having a cross section which is U-shaped with two flanges each extending respectively outwardly from the top of a different vertical leg of the U and then bending around upwardly and back to extend back parallel to the initially mentioned part of the flange but spaced therefrom, at least two flat bus bars lying on their broad side in the inside of the channel member and extending longitudinally of the channel member and insulated therefrom and from one another, a cover which is U-shaped in cross section and is within the channel member and above and lying on the uppermost portions of the set of bus bars and insulated therefrom, at least one horseshoe-shaped member having legs extending down on top of the cover and a bridge portion joining the legs together at a higher level than the top of the cover, a bolt extending downward through an opening in the bridge portion, a hold-down member extending from a place within the space between the initially mentioned part of the flange and the part extending back again parallel to it on one of the vertical legs of the channel member cross section to a place within the corresponding space on the other vertical leg, the hold-down member having an interior threaded portion registering with the opening, said bolt extending through the opening in the bridge portion and at least into the interior threaded portion of the hold-down member, to enable by turning of the bolt the cover to be tightened down on the bus bars by relative pressure as between the horseshoe-shaped member and cover on the one hand and the hold-down member and channel member on the other.

3. A bus bar and conduit setup in combination comprising a channel member which is U-shaped in cross section but with at least two flanges each of which extends outwardly from the top of a different leg of the U and then bends up around and back on itself with a space in between its initially mentioned outwardly extending part and the part going back on itself, a plurality of bus bars flatly positioned to extend longitudinally along inside the channel member, a cover U-shaped in cross section inside the channel member above the bus bars, a horseshoe shaped member having legs extending down on top of the cover and a bridge portion higher up extending from the top of one leg to the top of the other and having a hole for a bolt, a unitary hold-down member extending across between positions of the ends within the said spaces near the tops of the legs of the channel member and having a threaded hole, and a bolt extending through the hole in the bridge portion and threaded into the hole in the hold-down member to tighten down the bus bars by means of the cover.

4. In a bus tray electrical distribution system, flat insulated rigid and flexible laminated bus bars side by side and compressed into a coextending tray and cover having single and paired opposite phase bus bar ends extended, electrically separated, insulation removed for overlap joining to second bus bars that sandwich one half cross section and area of each bus bar end between the coextension of the remaining one half cross section and twice the area of the remainder half of each bus bar end, hold-down set-ups at intervals along the cover and remote from the tray and cover, extending across the tray and in one position engaging the two sides of the tray, channels bridging each hold-down setup from the cover and having in each case a base, bolts extending in each case through the base of the channel and through the hold-down setups, the hold-down setups including interior threads at least into which the bolts can extend, the hold-down setups in one position extending across the tray and securing the tray and also through each channel pressing the cover with respect to the tray.

5. In a bus tray electrical distribution system, flat insulated rigid and flexible laminated bus bars side by side and having paired opposite phase bus bar ends extended, electrically separated, insulation removed for overlap joining to second bus bars that sandwich one half cross section of each bus bar end between the coextension of the remaining one half cross section and at least some part of the other bus bar end, the thus joined bus bar ends being present as a joint, an envelope for the joint including a coextending tray in which the joint rests and which has outwardly extending flanges along its top edges and a coextending cover over and contacting the joint which cover extends from wall to wall of the tray, a hold-down means extending across the cover between the outward tray flanges, having a surface at each outward tray flange contacting a surface of the flange in a direction at least partly contrary to the direction in which the cover contacts the joint, and having an internally threaded hole for a bolt, a bridge setup extending across the hold-down means, contacting the cover on each side of the hold-down means and having an opening for a bolt which opening registers with the threaded hole in the hold-down means, and one single bolt for the particular hold-down means and bridge setup which extends through the opening and at least into the hole and is adapted to force the bridge against the cover to exert pressure on the joint.

6. In a bus tray electrical distribution system, a joint box bolted between two trays, and bus bar assemblies having at least a part of their length located within the respective trays, the joint box including a metal body in tray shape holding joints in the bus bars and a metal plate over the joint constituting a cover for the joint, insulation panels within the joint box that position the joints in staggered relationship, at the same time electrically separating them from each other and from the metal joint box and cover, the joints being overlapping joints, the joint box having outwardly extending flanges at the top of its tray-form sides, there being also a hold-down setup extending across between the outward flanges and in contact with them in a contact direction at least somewhat contrary to the direction between cover and joint and having a threaded hole, a bridge setup extending across the hold-down setup and contacting the cover on each side thereof and having an opening registering with the threaded hole, and a bolt going through the opening at least into the threaded hole and adapted to press the cover down onto a joint and compress the joint.

7. In an electrical distribution system, one group of bus bars including at least two which differ in phase and run parallel to each other with their wide sides face to face but spaced from one another and including also at least another two interrelated to each other in the same way as the first two and positioned parallel to the first two with narrow edges side by side to those of the first two but spaced from those of the first two, and their wide faces extending away from the first two, another group of bus bars similarly interrelated to each other as are those of the first group but located in prolongation of those of the first group and having end portions meeting those of the first group to conduct current, the respective meeting end portions including wide side faces juxtaposed in face-to-face contact with each other, and such meeting portions being collectively herein designated as a joint, enclosure structure for the joint which structure is self-contained structure independent of any structure which may enclose as much as an extended part of the rest of the bus bars, this enclosure structure including not only enclosure per se for the joints, but also insulating separator plate structure between bus bars of differing phase face-to-face but not in contact with each other at the joints, and presses located at particular such joints with effective pressure members outside the enclosure structure and bringing pressure on the enclosure structure and through these on such joints to press the juxtaposed faces together.

8. The combination of claim 7, in which the enclosure includes a tray having outwardly extending flanges at its side tops and a cover, and there is a hold-down setup extending across between the flanges and contacting them in a direction contrary to that between cover and joint and having a threaded hole, a bridge setup extending across the hold-down setup and contacting the cover on each side thereof and having an opening registering with the threaded hole, and a bolt extending through the opening at least into the hole and adapted to press the cover down at the joint to create pressure between intercontacting wide bus bar faces at the joint.

9. In an electrical distribution system, bus bars meeting end to end one in prolongation of the other and having overlapping wide side faces contacting each other, and also producing a particular group of bus bar joints, electrically in a parallel to each other but some located staggered relative to the others, enclosing structure for enclosing the bus bar joints having an element movable relative to the bus bars, the structure being a self-contained structure limited to the area surrounding the particular group of joints, and means at each joint but outside the movable element for pressing on the movable element and through it on the joints, this means including one or more hold-down members extending across the structure and in one position engaging the structure at opposite areas of the structure and acting in cooperation with the rest of the structure to constitute a press encompassing the bus bar joints.

10. In an electrical distribution system, structure comprising bus bars meeting end to end and having overlapping wide side faces contacting each other, and constituting bus bar joints, trays receiving the bus bars, said trays having outwardly extending flanges, covers for the trays, means for compressing the bus bars, and one or more hold-down members contacting said flanges in a direction at least partly contrary to that from the covers to the bus bars, and the means for compressing the bus bars including bridge members across the hold-down members and contacting both sides of the covers, and bolts extending from the top of the bridge members toward the covers at least down into the hold-down members.

11. In an end-to-end joint for bus bars, a first series of bus bars having insulation on them and arranged in depth, a second series of bus bars opposed to the first and having insulation on them and arranged in depth, the bus bars at the ends having a portion which is stripped of insulation, such portions in the same phase including broad faces of bus bars in the different series lying side by side with broad faces juxtaposed against each other to transmit current from one to the other, and a self-contained joint box setup having a structure independent of the structure of any enclosure for the rest of the bus bars, which setup includes as elements an enclosure around the joint, an insulating spacer between bus bars of different phases which spacer is located at the joint, and means located at the joint for compressing the juxtaposed faces against each other, there being similar pairs of series of bus bars located with their edges adjacent the respective edges of the above-mentioned pair of series and their widths parallel to but extending away from the widths of the above-mentioned pair of series, these other parts of series having their own insulating spacers and means for compressing but sharing the same joint box with the first-mentioned pair of series, and the bus bars all have elongated longitudinal slots, open-ended slots, at their respective ends, through which slots extend bolts from outside the enclosure to constitute said means for compressing the joints, at least some of these bolts being in staggered position relative to each other.

12. In an end-to-end joint for bus bars, at least two groups of bus bars arranged with two of the broad sides of bus bars in each group being against one another and with insulation to separate them, at least one of the bus bars in one group being arranged relative to at least one longitudinally opposite one in another group so that they are in prolongation of one another with opposite portions stripped of insulation and the one bus bar lying with its wide face against that of the other bus bar at the place of the stripping of insulation, an enclosing setup at the joint which setup is independent in its structure from the structure for any enclosure for the rest of the bus bars, this setup including insulation between different phases at the place where the bus bar is stripped, and a press located at the joint which compresses the bus bar portions which are stripped so that at least two adjoining bus bars of the same phase lying against one another on the broad face are placed together without short circuit, the bus bars including extended slots going longitudinally inward from their ends and the press including bolts each of which extends from the enclosing setup on both sides through the slots in a plurality of such pairs of bus bars having their wide faces aginst each other and having insulation around them in the portions extending through the slots.

* * * * *